UNITED STATES PATENT OFFICE.

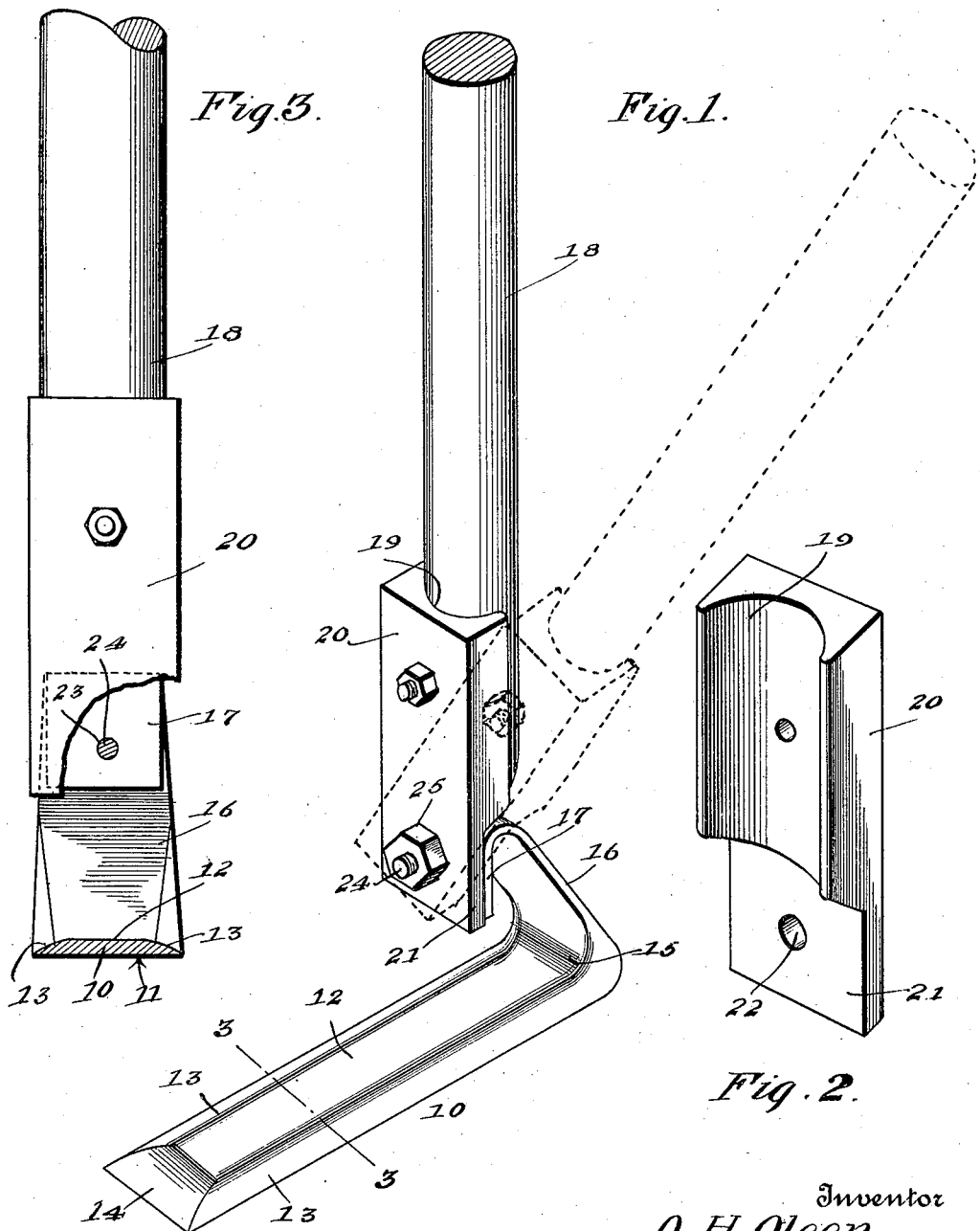

OLOF H. OLEEN, OF COLUMBIA CITY, OREGON.

GARDEN-TOOL.

1,342,392.            Specification of Letters Patent.      Patented June 1, 1920.

Application filed April 26, 1919, Serial No. 292,871. Renewed April 24, 1920. Serial No. 376,424.

*To all whom it may concern:*

Be it known that I, OLOF H. OLEEN, a citizen of the United States, residing at Columbia City, in the county of Columbia and State of Oregon, have invented new and useful Improvements in Garden-Tools, of which the following is a specification.

This invention relates to garden tools and comprehends the combination hoe and cultivator by means of which a wide and narrow cut may be made; a handle being arranged for adjustment to permit the tool to be conveniently held by either right or left handed persons.

The nature and advantage of the invention will be better understood when the following detailed description is taken in connection with the accompanying drawings, the invention residing in the construction, combination and arrangement of parts as claimed.

In the drawing forming part of this specification, like numerals of reference indicate similar parts in the several views and wherein:—

Figure 1 is a perspective view showing the normal position of the handle by full lines; in its adjusted position by dotted lines.

Fig. 2 is a detail view of the connecting plate for the handle.

Fig. 3 is a sectional view taken on line 3—3 of Fig. 1.

In carrying out my invention, I make use of an elongated blade 10 having a flat bottom 11 and a transversely curved upper surface 12. The blade is sharpened along both of its longitudinal edges, and also at the front end to provide cutting edges 13 and 14 respectively. The opposite end of the blade is curved as at 15 and extended upwardly and forwardly as at 16, the obliquely disposed portion terminating to provide a downwardly extending vertically disposed lug 17. A handle 18 of any desired length is connected with the blade in a manner to be hereinafter more fully described. Manifestly, the design of the blade, coupled with the fact that the handle 18 may be maintained in a vertical position, or at an angle to either side of the blade, permits the tool to be conveniently handled by either right or left handed persons, in the making of a wide or narrow cut. Again, the tool may be worked very close to small plants without cutting or covering the plant with the soil.

The handle 18 has its lower end received within the channel 19 of a connecting plate 20, the channel being of cross sectional configuration to accommodate itself to the handle, which can vary in cross sectional configuration. The handle may be secured within the channel in any suitable manner and as shown in this particular instance these parts are bolted together to permit the handle to be removed from the plate should it be found necessary to do so. One end of the plate 20 is reduced, this reduced extremity 21 having an opening 22 adapted to register with an opening 23 in the lug 17, for the reception of a threaded bolt 24 utilized to hold said parts fixed relatively when a nut 25 is tightened upon the bolt. However, the handle 18 may be maintained in a true vertical position, whereby loosening the nut 25 the said handle can be swung to any desired angle at either side of the blade for the convenience of the user. Consequently, by changing the position of the handle 18 either of the longitudinal cutting edges 13 may be used, thus permitting the operator to work backward while using the tool, which of course eliminates packing of wet soil after the soil has been cultivated.

While I have shown and described what I consider the preferred embodiment of the invention, I desire to have it understood that I do not limit myself to the exact construction and arrangement of parts disclosed, inasmuch as such changes may be resorted to when desired as fall within the scope of what is claimed.

What I claim is:—

In a tool of the character described, an elongated blade having at one end a shank extended upwardly and forwardly, and terminating to provide a depending vertically disposed lug, a handle, a vertically disposed plate having a groove arranged at one side for the reception of said handle, means for securing the handle within the groove, said plate having a reduced extremity arranged parallel with said depending lug bearing against the latter, and a bolt passed through said reduced extremity and lug and pivotally associating said plate with the lug whereby the handle can be swung into different angular positions with respect to the blade, and a nut carried by said bolt and holding said handle fixed in a given position when tightened.

In testimony whereof I affix my signature.

OLOF H. OLEEN.